(12) United States Patent
Deng et al.

(10) Patent No.: US 10,216,785 B2
(45) Date of Patent: Feb. 26, 2019

(54) DYNAMICALLY-SORTED CONTACT INFORMATION

(75) Inventors: Peter Xiu Deng, Mountain View, CA (US); Robert Mason, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/589,966

(22) Filed: Aug. 20, 2012
(Under 37 CFR 1.47)

(65) Prior Publication Data
US 2014/0052742 A1    Feb. 20, 2014

(51) Int. Cl.
| G06F 7/00 | (2006.01) |
| G06F 17/30 | (2006.01) |
| G06Q 50/00 | (2012.01) |
| H04L 29/08 | (2006.01) |

(52) U.S. Cl.
CPC .... *G06F 17/30386* (2013.01); *G06F 17/3087* (2013.01); *G06F 17/30867* (2013.01); *G06Q 50/01* (2013.01); *H04L 67/1061* (2013.01); *H04L 67/1068* (2013.01); *H04L 67/1072* (2013.01); *H04L 67/18* (2013.01); *H04L 67/22* (2013.01); *H04L 67/24* (2013.01)

(58) Field of Classification Search
None
See application file for complete search history.

(56) References Cited

U.S. PATENT DOCUMENTS

| 8,156,098 | B1* | 4/2012 | Landsman et al. ........... 707/706 |
| 8,423,459 | B1* | 4/2013 | Green ................ G06Q 30/0269 705/39 |
| 8,468,164 | B1* | 6/2013 | Paleja ............... G06F 17/30867 707/767 |
| 2004/0203746 | A1* | 10/2004 | Knauerhase .... H04M 1/274516 455/432.1 |
| 2005/0289180 | A1* | 12/2005 | Pabla et al. ................. 707/104.1 |
| 2008/0059576 | A1* | 3/2008 | Liu ....................... H04L 67/306 709/204 |
| 2008/0133580 | A1* | 6/2008 | Wanless ............ H04L 29/12122 |
| 2008/0275865 | A1* | 11/2008 | Kretz ................ G06F 17/30867 |
| 2009/0113313 | A1* | 4/2009 | Abernethy et al. ........... 715/757 |
| 2009/0177744 | A1* | 7/2009 | Marlow et al. ............... 709/204 |
| 2010/0082693 | A1* | 4/2010 | Hugg et al. .................... 707/798 |
| 2010/0330972 | A1* | 12/2010 | Angiolillo ..................... 455/418 |
| 2011/0035455 | A1* | 2/2011 | Sharma ............. G06Q 30/0207 709/206 |
| 2011/0047212 | A1* | 2/2011 | Levy et al. .................... 709/204 |
| 2011/0113149 | A1* | 5/2011 | Kaal .................... H04L 67/104 709/231 |

(Continued)

*Primary Examiner* — David T. Brooks
(74) *Attorney, Agent, or Firm* — Baker Botts L.L.P.

(57) ABSTRACT

In one embodiment, a computer system accesses for a first user contact information of one or more second users. The computer system then determines one or more contemporaneous attributes of the first user, determines one or more contemporaneous attributes of each of the second users, and then dynamically sorts the contact information of the second users based at least on the contemporaneous attributes of the first user and the contemporaneous attributes of the second users. The computer system then provides the sorted contact information of the second users for display to the first user.

19 Claims, 6 Drawing Sheets

(56) References Cited

U.S. PATENT DOCUMENTS

| | | | |
|---|---|---|---|
| 2011/0191352 A1* | 8/2011 | Jones | G06F 17/30 707/749 |
| 2011/0231407 A1* | 9/2011 | Gupta et al. | 707/748 |
| 2011/0276396 A1* | 11/2011 | Rathod | 705/14.49 |
| 2012/0124059 A1* | 5/2012 | Pratt | G06Q 10/107 707/748 |
| 2012/0203821 A1* | 8/2012 | Czajka | G06Q 10/107 709/203 |
| 2012/0226704 A1* | 9/2012 | Boland | G06F 17/30867 707/749 |
| 2012/0272163 A1* | 10/2012 | Stochosky | H04L 67/10 715/753 |
| 2013/0111366 A1* | 5/2013 | Silbey | A63F 13/12 715/757 |
| 2013/0172014 A1* | 7/2013 | Kaul | H04W 4/025 455/456.3 |
| 2013/0172051 A1* | 7/2013 | Cudak et al. | 455/566 |
| 2013/0316735 A1* | 11/2013 | Li | H04W 4/21 455/456.3 |
| 2014/0006517 A1* | 1/2014 | Hsiao | G06Q 50/01 709/205 |
| 2014/0011481 A1* | 1/2014 | Kho | H04W 4/02 455/414.1 |
| 2014/0012860 A1* | 1/2014 | Kandur Raja | H04M 1/274583 707/748 |
| 2014/0082074 A1* | 3/2014 | Workman | H04L 67/10 709/204 |
| 2015/0119002 A1* | 4/2015 | Chen | H04W 4/001 455/414.1 |

* cited by examiner

DYNAMICALLY-SORTED CONTACT INFORMATION

TECHNICAL FIELD

This disclosure generally relates to dynamically sorting contact information.

BACKGROUND

Contact information allows an individual to contact another individual or entity. Contact information may take many forms, such as identifying a physical address, a unique number or character string associated with a device, a unique number or character string associated with an account (such as an email account), or any other suitable form. If contact information from many individuals or entities is simultaneously displayed, a format must be chosen to organize and display the contact information. Frequently, the contact information is organized in alphabetical order of the name of the individual or entity being contacted. For example, a physical or electronic telephone book may list contact information of individuals or entities in alphabetical order.

SUMMARY

A user of a system that contains or has access to contact information may wish to access the contact information of other users of the system. In particular embodiments, contact information is dynamically sorted based on the similarity between one or more contemporaneous attributes of a first user accessing the contact information and one or more contemporaneous attributes of each user corresponding to the contact information being sorted.

In particular embodiments, contemporaneous attributes may relate to information known by or accessible to the system, such as the location, preferences, plans, or emotional state of a user, or individuals or entities in the proximity of a user. In particular embodiments, contemporaneous attributes may relate to interactions between a user and a device, application, or network. As an example, a first user may broadcast plans to go to a social event at a particular time. Contact information for other users may be sorted based on how similar those other users' plans are to the first user. When accessed by the first user, contact information of users going to the same social event as the first user may appear before the contact information of users going to social events at nearby locations, which may appear before contact information of users who have no plans, which may appear before contact information of users affirmatively staying at home during the time period of the social event the first user is attending.

DESCRIPTION OF EXAMPLE EMBODIMENTS

Figure 1:
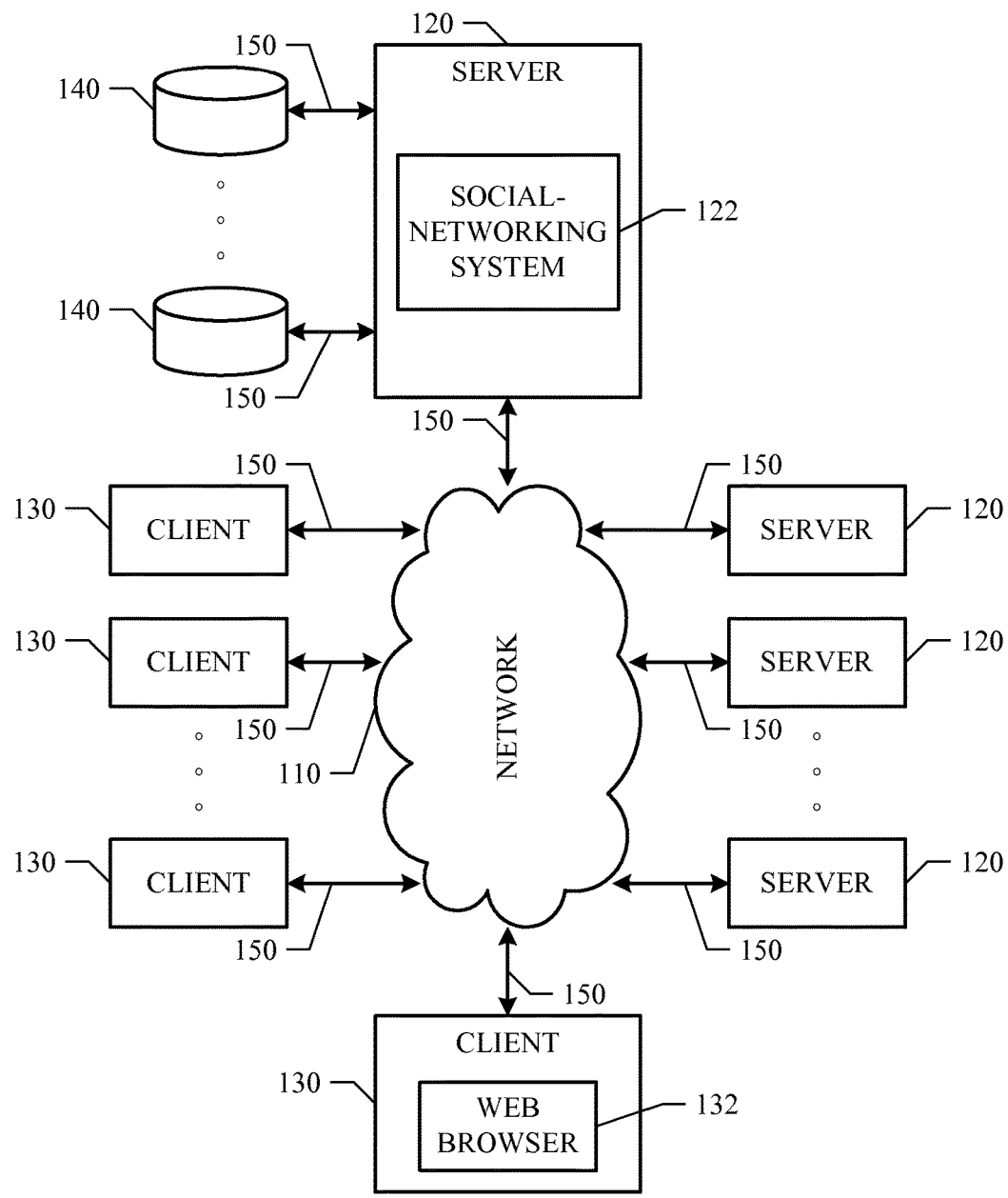
FIG. 1 illustrates an example network environment.

FIG. 1 illustrates an example network environment 100. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 150 couple a server 120 or a client 130 to network 110. In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, a cellular technology-based network, a satellite communications technology-based network, or another link 150 or a combination of two or more such links 150. This disclosure contemplates any suitable links 150 coupling servers 120 and clients 130 to network 110.

In particular embodiments, each server 120 may be a unitary server or a distributed server spanning multiple computers or multiple datacenters. Servers 120 may be of various types, such as, for example and without limitation, web server, news server, mail server, message server, advertising server, file server, application server, exchange server, database server, proxy server, another server suitable for performing functions and/or processes described herein, or any combination thereof. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores. In particular embodiments, a social-networking system 122 may be hosted on a server 120.

Various portions of social networking system 122 may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems.

Figure 2:
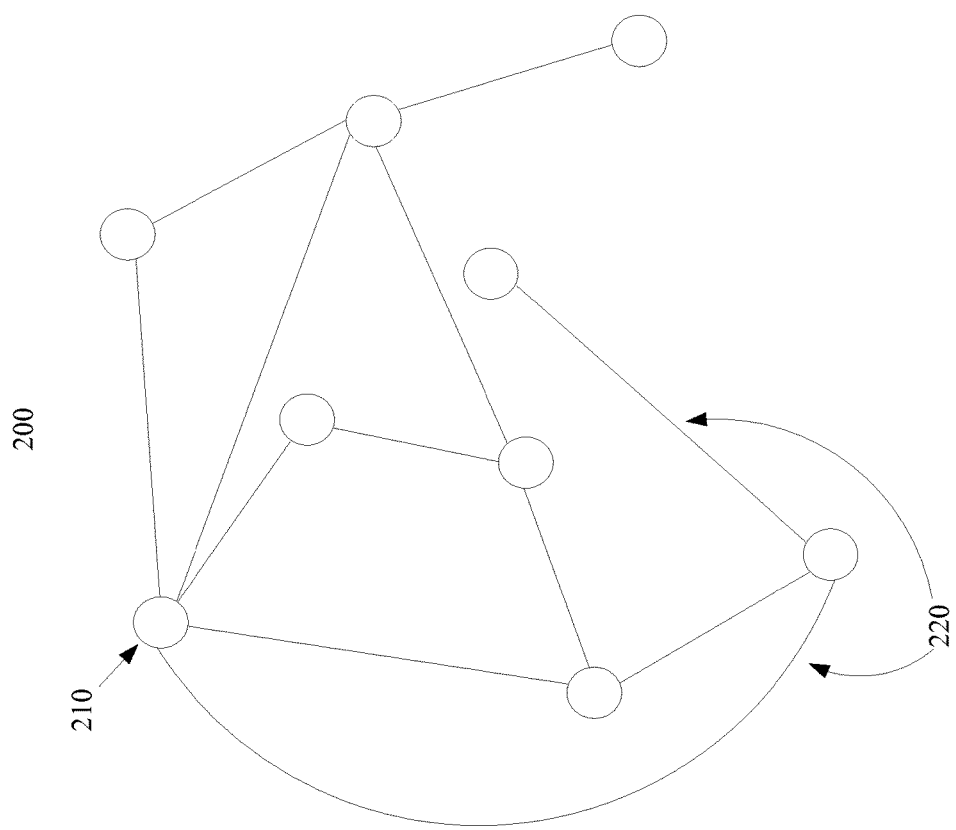
FIG. 2 illustrates an example social network.

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. FIG. 2 illustrates and example social graph 200. In particular embodiments, one or more computing systems of a social network system implementing the social network environment include, store, or have access to one or more data structures that include a social graph for use in implementing the social network environment described herein. In particular embodiments, social graph 200 may have nodes 210 such as user nodes that each correspond to a respective user of the social network environment, concept nodes each devoted or directed to a particular concept, or topic nodes, which may or may not be ephemeral, each devoted or directed to a particular topic of current interest among users of the social network environment. In particular embodiments, each node 210 has, represents, or is represented by, a corresponding web page ("profile page") hosted or accessible in the social network environment. By way of example, a user node may have a corresponding user profile page in which the corresponding user can add content, make declarations, and otherwise express himself or herself. By way of example, as will be described below, various web pages hosted or accessible in the social network environment such as, for example, user profile pages, concept profile pages, or topic profile pages, enable users to post content, post status updates, post messages, post comments including comments on other posts submitted by the user or other users, declare interests, declare a "like" (described below) towards any of the aforementioned posts as well as pages and specific content, or to otherwise express themselves or perform various actions (hereinafter these and other user actions may be collectively referred to as "posts" or "user actions"). In some embodiments, posting may include linking to, or otherwise referencing additional content, such as media content (e.g., photos, videos, music, text, etc.), uniform resource locators (URLs), and other nodes, via their respective profile pages, other user profile pages, concept profile pages, topic pages, or other web pages or web applications. Such posts, declarations, or actions may then be viewable by the authoring user as well as other users. In particular embodiments, social graph 200 further includes a plurality of edges 220 that each define or represent a connection between a corresponding pair of nodes 210 in social graph 200. This disclosure contemplates a social network having any suitable number of nodes representing any suitable entity, concept, or thing, and any suitable edges connecting the nodes.

In particular embodiments, information about the entity, concept, or thing a node represents its relationships to other entities, concepts, or things may be determined from the social graph. In particular embodiments, a node or edge may store or access information about the entity, concept, or thing a node represents. This information may be referred to as "express information" because it may be expressly determined from the information available to the node. For example, a user of a social network may directly indicate that he likes ice cream by selecting a "like" indicator accessible by the social network. This information is accessible by the node representing the user and/or the node representing ice cream (or the particular brand of ice cream). Thus, that the user likes ice cream is information that can be expressly determined from the social graph. In particular embodiments, information about an entity, concept a thing may be inferred by information in the social graph relating to the entity, concept, or thing. Inferences may be made from express information stored in the node corresponding to the entity, concept, or thing; express information about the connections (stored in the social graph as edges) between the node and other nodes; or express information stored in other nodes in the social graph (for example, nodes that the node representing the entity, concept, or thing is connected to). For example, as described above express information may indicate that a user likes ice cream. Express information may also indicate that the user's nephew also likes ice cream, and an edge may indicate that the user and his nephew are connected in the social network. Thus, the network may infer that the user and his nephew would enjoy having ice cream together. While the above example is a simple one, it illustrates that a social network may contain express information on a entity, concept, or thing, and that information about an entity, concept, or thing may be inferred from express information available to the network. This disclosure contemplates inferring any suitable information relating to a concept, entity or thing from express information stored in, accessible to, or referenced by one or more nodes or edges in the social network.

In particular embodiments, when a user submits a post such as, by way of example, those just described, or performs some other action such as, by way of example, typing a word or query into a search box, clicking on a hyperlink, or even just visiting a particular page, the post or action is received or detected by the social network system described herein. The social network system analyzes the content of the post (e.g., the words, media, or other content in the post, or in the case of a "like", the words, media, or other content in the "liked" post) or various information associated with the performed action (e.g., the word(s) entered in the search box, the information accessed when clicking the hyperlink, or the information provided in the requested web page) to determine or extract one or more topics of the post (e.g., the theme, main idea, or subject of the post) or topics associated with the performed action (e.g., the topic, theme, main idea, title, or subject of the search or accessed page). Subsequently, the social network system searches a database or index of topics and a correlated database of previously received posts from other users to identify any related posts from the other users that share one or more of the same or similar topics. In particular embodiments, the social network system then transmits for presentation to the user one or more related posts or information about the related posts including, by way of example, text or other content as well as, in particular embodiments, information regarding the authoring users of the related posts. In one implementation, the related posts may be transmitted in substantially real-time relative to the post submitted or action performed by the user such that the user is presented with one or more related posts in close temporal proximity. The identification and presentation of related posts form a basis for enabling spontaneous conversations around the topic or topics of the user's posts or actions and related posts. More particularly, the social network system may search a database or index of topics to identify one or more related posts stored in a database of posts having the greatest or at least a threshold relevance to the user's submitted post or detected action and present one or more of the related posts, or information associated with the related posts, to the user in one or more of a number of forms, and in particular embodiments, with one or more interactive elements. In particular embodiments, the interactive elements enable the user to view the related posts or information associated with the related posts and to comment on or otherwise interact with the related posts or the authoring users of the related posts by way of the interactive elements presented with the respective related posts or other information associated with the related posts. In this way, the social network environment facilitates interaction amongst the user and the authoring users of the related posts, and in particular embodiments, without additional input by the user submitting the post or performing the action. That is, in particular embodiments, the social network system searches and identifies related posts without requiring further instruction by the user after the user submits his or her own post or performs certain actions.

In various example embodiments one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. In the context of a social network, a "registered user" refers to a user that has officially registered within the social network environment. In particular embodiments, the users and user nodes described herein refer to registered users only. In particular embodiments, the users and user nodes described herein may refer to users that have not registered with the social network environment described herein. In particular embodiments, each user has a corresponding "profile" page stored, hosted, or accessible by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. In the context of a social networking environment, an "authenticated user" refers to a user who has been authenticated by the social network environment as being the user claimed in a corresponding profile page to which the user has administrative rights or, alternately, a suitable trusted representative of the claimed user.

Returning to the network environment of FIG. 1, in particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or clients 130 to manage, e.g., retrieve, modify, add, or delete, the information stored in data storage 140.

In particular embodiments, each client 130 may be an electronic device including hardware, software, or embedded logic components or a combination of two or more such components and capable of carrying out the appropriate functionalities implemented or supported by client 130. For example and without limitation, a client 130 may comprise a computer system such as: a desktop computer, a notebook or laptop, a netbook, a tablet, an e-book reader, a GPS device, a camera, a personal digital assistant (PDA), a handheld electronic device, a mobile telephone, or another similar processor-based electronic device. This disclosure contemplates any suitable clients 130. A client 130 may enable a network user at client 130 to access network 130. A client 130 may enable its user to communicate with other users at other clients 130. In particular embodiments, a client device 130 may comprise a personal computing device 300 as described in FIGS. 3A and 3B.

A client 130 may have a web browser 132, such as MICROSOFT® INTERNET EXPLORER®, GOOGLE CHROME™ or MOZILLA FIREFOX®, and may have one or more add-ons, plug-ins, or other extensions, such as TOOLBAR or YAHOO TOOLBAR®. A user at client 130 may enter a Uniform Resource Locator (URL) or other address directing the web browser 132 to a server 120, and the web browser 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT®, JAVA®, MICROSOFT® SILVERLIGHT®, combinations of markup language and scripts such as AJAX (Asynchronous Javascript® and XML), and the like. Herein, reference to a web page encompasses one or more corresponding web page files (which a browser may use to render the web page) and vice versa, where appropriate.

Figure 3B:
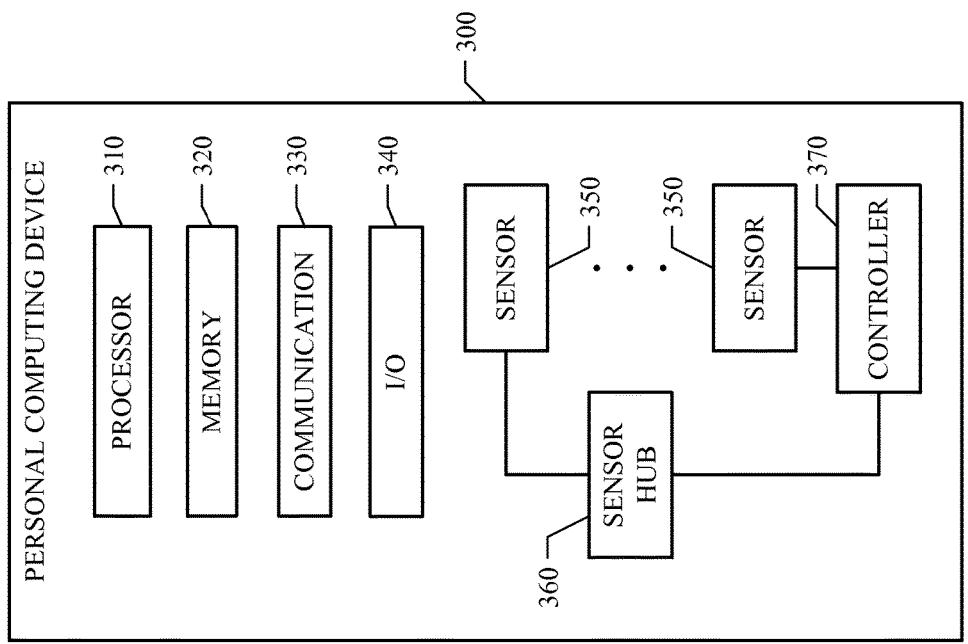
FIGS. 3A-B illustrate an example personal computing device.
Figure 3A:
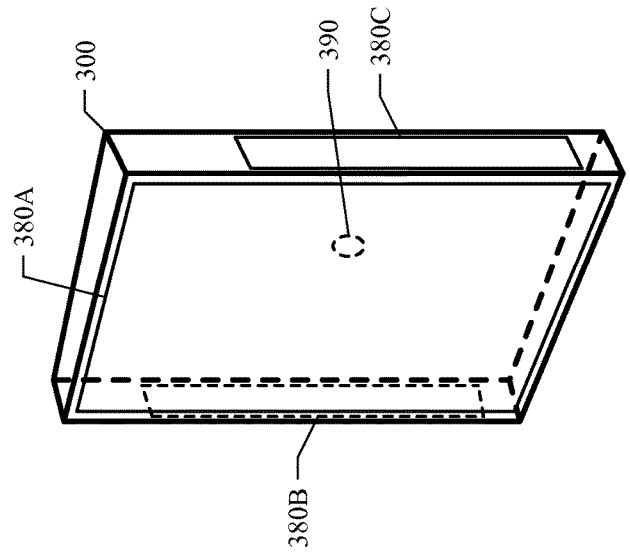

FIG. 3A illustrates an example personal computing device 300. In particular embodiments, personal computing device 300 may comprise a processor 310, a memory 320, a communication component 330 (e.g., antenna and communication interface for wireless communications), one or more input and/or output (I/O) components and/or interfaces 340, and one or more sensors 350. In particular embodiments, one or more I/O components and/or interfaces 340 may incorporate one or more sensors 350. In particular embodiments, personal computing device 300 may comprise a computer system or an element thereof as described in FIG. 6 and its associated description.

In particular embodiments, a personal computing device, such as a mobile device, may include various types of sensors 350, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 300 is moving and the speed of the movement; thermometer for measuring the temperature change near the personal computing device 300; proximity sensor for detecting the proximity of the personal computing device 300 to another object (e.g., a hand, desk, or other object); light sensor for measuring the ambient light around the personal computing device 300; imaging sensor (e.g., camera) for capturing digital still images and/or video of objects near the personal computing device 300 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 300; etc. This disclosure contemplates that a personal computing device may include any applicable type of sensor. Sensors may provide various types of sensor data, which may be analyzed to determine the user's intention with respect to the mobile electronic device at a given time.

In particular embodiments, a sensors hub 360 may optionally be included in personal computing device 300. Sensors 350 may be connected to sensors hub 360, which may be a low power-consuming processor that controls sensors 350, manages power for sensors 350, processes sensor inputs, aggregates sensor data, and performs certain sensor functions. In addition, in particular embodiments, some types of sensors 350 may be connected to a controller 370. In this case, sensors hub 360 may be connected to controller 370, which in turn is connected to sensor 350. Alternatively, in particular embodiments, there may be a sensor monitor in place of sensors hub 360 for managing sensors 350.

In particular embodiments, in addition to the front side, personal computing device 300 may have one or more sensors for performing biometric identification. Such sensors may be positioned on any surface of personal computing device 300. In example embodiments, as the user's hand touches personal computing device 300 to grab hold of it, the touch sensors may capture the user's fingerprints or palm vein pattern. In example embodiments, while a user is viewing the screen of personal computing device 300, a camera may capture an image of the user's face to perform facial recognition. In example embodiments, while a user is viewing the screen of personal computing device 300, an infrared scanner may scan the user's iris and/or retina. In example embodiments, while a user is in contact or close proximity with personal computing device 300, chemical and/or olfactory sensors may capture relevant data about a user. In particular embodiments, upon detecting that there is a change in state with respect to the identity of the user utilizing personal computing device 300, either by itself or in combination with other types of sensor indications, personal computing device 300 may determine that it is being shared.

In particular embodiments, in addition to the front side, the personal computing device 300 may have touch sensors on the left and right sides. Optionally, the personal computing device 300 may also have touch sensors on the back, top, or bottom side. Thus, as the user's hand touches personal computing device 300 to grab hold of it, the touch sensors may detect the user's fingers or palm touching personal computing device 300. In particular embodiments, upon detecting that there is a change in state with respect to a user touching personal computing device 300, either by itself or in combination with other types of sensor indications, personal computing device 300 may determine that it is being shared.

In particular embodiments, personal computing device 300 may have an accelerometer in addition to or instead of the touch sensors on the left and right sides. Sensor data provided by the accelerometer may also be used to estimate whether a new user has picked up personal computing device 300 from a resting position, e.g., on a table or desk, display shelf, or from someone's hand or from within someone's bag. When the user picks up personal computing device 300 and brings it in front of the user's face, there may be a relatively sudden increase in the movement speed of personal computing device 300. This change in the device's movement speed may be detected based on the sensor data supplied by the accelerometer. In particular embodiments, upon detecting that there is a relatively significant increase in the speed of the device's movement, either by itself or in combination with other types of sensor indications, personal computing device 300 may determine that it is being shared.

In particular embodiments, personal computing device 300 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 300. When personal computing device 300 is stored on a shelf or in the user's bag, it may stay mostly in one orientation. However, when the user grabs hold of personal computing device 300 and lifts it up and/or moves it closer to bring it in front of the user's face, there may be a relatively sudden change in the orientation of personal computing device 300. The orientation of personal computing device 300 may be detected and measured by the gyrometer. If the orientation of personal computing device 300 has changed significantly, In particular embodiments, upon detecting that there is a relatively significant change in the orientation of personal computing device 300, either by itself or in combination with other types of sensor indications, personal computing device 300 may determine that it is being shared.

In particular embodiments, personal computing device 300 may have a light sensor. When personal computing device 300 is stored in a user's pocket or case, it is relatively dark around personal computing device 300. On the other hand, when the user brings personal computing device 300 out of his pocket, it may be relatively bright around personal computing device 300, especially during day time or in well-lit areas. The sensor data supplied by the light sensor may be analyzed to detect when a significant change in the ambient light level around personal computing device 300 occurs. In particular embodiments, upon detecting that there is a relatively significant increase in the ambient light level around personal computing device 300, either by itself or in combination with other types of sensor indications, personal computing device 300 may determine that it is being shared.

In particular embodiments, personal computing device 300 may have a proximity sensor. The sensor data supplied by the proximity sensor may be analyzed to detect when personal computing device 300 is in close proximity to a specific object, such as the user's hand. For example, mobile device 300 may have an infrared LED (light-emitting diode) 390 (i.e., proximity sensor) placed on its back side. When the user holds such a mobile device in his hand, the palm of the user's hand may cover infrared LED 390. As a result, infrared LED 390 may detect when the user's hand is in close proximity to mobile device 300. In particular embodiments, upon detecting that personal computing device 300 is in relatively close proximity to the user's hand, either by itself or in combination with other types of sensor indications, personal computing device 300 may determine that it is being shared.

A personal computing device 300 may have any number of sensors of various types, and these sensors may supply different types of sensor data. Different combinations of the individual types of sensor data may be used together to detect and estimate a user's current intention with respect to personal computing device 300 (e.g., whether the user really means to take personal computing device 300 out of his pocket and use it). Sometimes, using multiple types of sensor data in combination may yield a more accurate, and thus better, estimation of the user's intention with respect to personal computing device 300 at a given time than only using a single type of sensor data. Nevertheless, it is possible to estimate the user's intention using a single type of sensor data (e.g., touch-sensor data).

FIG. 3B illustrates the exterior of an example personal computing device 300. Personal computing device 300 has approximately six sides: front, back, top, bottom, left, and right. Touch sensors may be placed anywhere on any of the six sides of personal computing device 300. For example, in FIG. 3B, a touchscreen incorporating touch sensors 380A is placed on the front of personal computing device 300. The touchscreen may function as an input/output (I/O) component for personal computing device 300. In addition, touch sensors such as touch sensors 380B and 380C may be placed on the left and right sides of personal computing device 300, respectively. Touch sensors 380B and 380C may detect a user's hand touching the sides of personal computing device 300. In particular embodiments, touch sensors 380A, 380B, 380C may be implemented using resistive, capacitive, and/or inductive touch sensors. The electrodes of the touch sensors 380A, 380B, 380C may be arranged on a thin solid piece of material or a thin wire mesh. In the case of capacitive touch sensors, there may be two types of electrodes: transmitting and receiving. These electrodes may be connected to a controller (e.g., controller 370 illustrated in FIG. 3A), which may be a microchip designed to drive the transmitting electrodes with electrical pulses and measure the changes in capacitance from the receiving electrodes caused by a user's touches in order to detect the locations of the user touches.

Of course, personal computing device 300 is merely an example. In practice, a device may have any number of sides, and this disclosure contemplates devices with any number of sides. The touch sensors may be placed on any side of a device, and this disclosure contemplates a device containing any suitable number and type of touch sensors.

In particular embodiments, personal computing device 300 may have a proximity sensor 390 (e.g., an infrared LED) placed on its back side. Proximity sensor 390 may be able to supply sensor data for determining its proximity, and thus the proximity of personal computing device 300, to another object.

Figure 4:
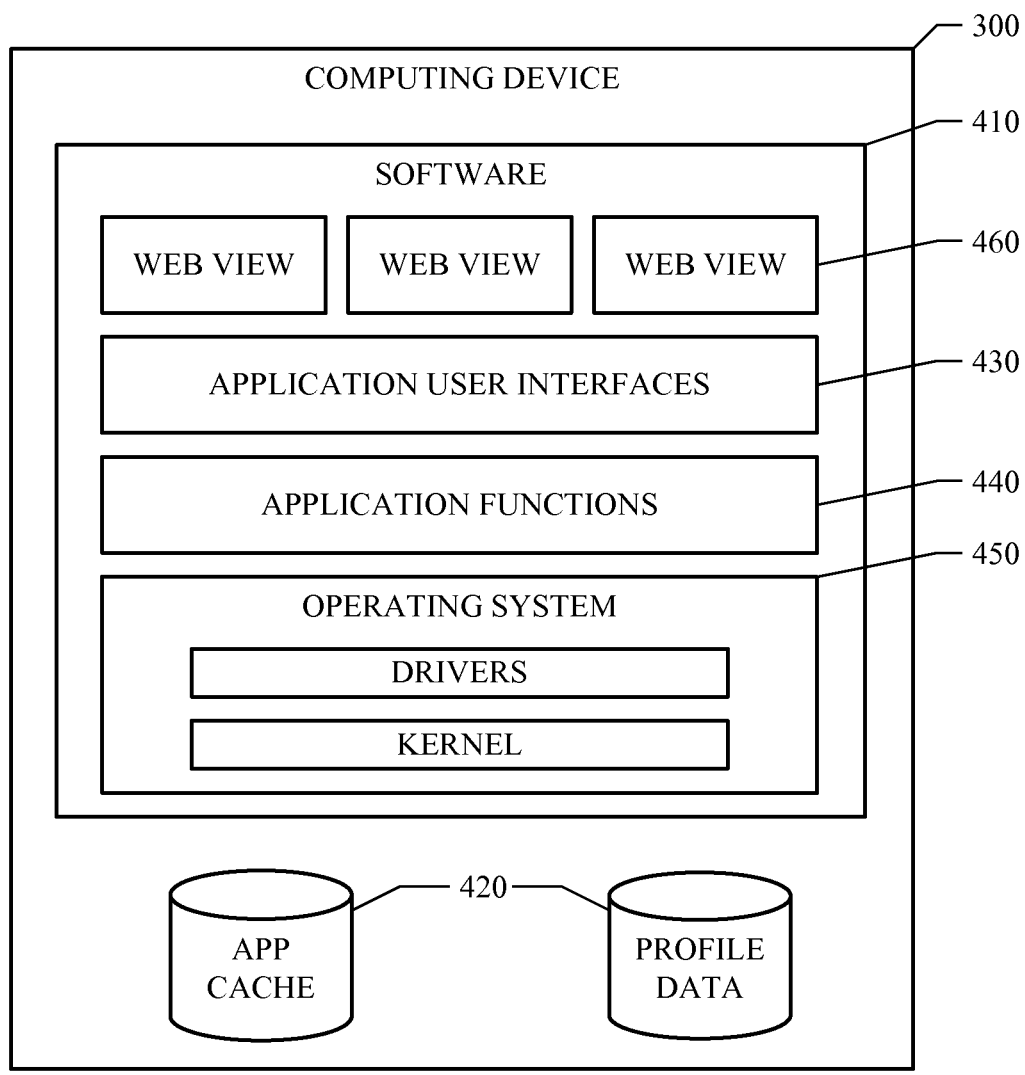
FIG. 4 illustrates an example software architecture for information and applications on a personal computing device.

FIG. 4 illustrates an example software architecture 400 for information and applications on a personal computing device 400. In particular embodiments, software architecture 400 may comprise software 410 and data store(s) 420. In particular embodiments, personal information may be stored in an application data cache 420 and/or a profile data store 420 and/or another data store 420. In particular embodiments, one or more software applications may be executed on personal computing device 400. In particular embodiments, they may be web-based applications hosted on servers. For example, a web-based application may be associated with a URI (Uniform Resource Identifier) or URL (Uniform Resource Locator). From personal computing device 400, a user may access the web-based application through its associated URI or URL (e.g., by using a web browser). Alternatively, in other embodiments, they may be native applications installed and residing on personal computing device 400. Thus, software 410 may also include any number of application user interfaces 430 and application functions 440. For example, one application (e.g., Google Maps®) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using personal computing device 400; a fifth application may allow the device user to receive and initiate VoIP and/or cellular network calls, and so on. Each application has one or more specific functionalities, and the software (e.g., one or more software modules) implementing these functionalities may be included in application functions 440. Each application may also have a user interface that enables the device user to interact with the application, and the software implementing the application user interface may be included in application user interfaces 430. In particular embodiments, the functionalities of an application may be implemented using JavaScript®, Java®, C, or other suitable programming languages. In particular embodiments, the user interface of an application may be implemented using HyperText Markup Language (HTML), JavaScript®, Java®, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 450 is Google's Android™ mobile technology platform. With Android®, there is a Java® package called "android.webkit", which provides various tools for browsing the web. Among the "android.webkit" package, there is a Java class called "android.webkit.WebView", which implements a View for displaying web pages. This class uses the WebKit rendering engine to display web pages and includes methods to navigate forward and backward through a history, zoom in, zoom out, perform text searches, and so on. In particular embodiments, an application user interface 430 may utilize Android's WebView application programming interface (API) to display each web page of the user interface in a View implemented by the "android.webkit.WebView" class. Thus, in particular embodiments, software 410 may include any number of web views 460, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 460 or application user interfaces 430. Each input event may be forwarded to application functions 440, or application functions 440 may listen for input events thus generated. When application functions 440 receive an input event, the appropriate software module in application functions 440 may be invoked to process the event. In addition, specific functionalities provided by operating system 450 and/or hardware (e.g., as described in FIGS. 1 and 3A-B) may also be invoked. For example, if the event is generated as a result of the user pushing a button to take a photo with personal computing device 400, a corresponding image processing module may be invoked to convert the raw image data into an image file (e.g., JPG or GIF) and store the image file in the storage 420 of personal computing device 400. As another example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 440 or operating system 450. Each output event may be forwarded to application user interfaces 430, or application user interfaces 430 may listen for output events thus generated. When application user interfaces 430 receive an output event, it may construct a web view 460 to display a web page representing or containing the output. For example, in response to the user selecting an icon to compose an instant message, an output may be constructed that includes a text field that allows the user to input the message. This output may be presented to the user as a web page and displayed to the user in a web view 460 so that the user may type into the text field the message to be sent.

The user interface of an application may be implemented using a suitable programming language (e.g., HTML, JavaScript®, or Java®). More specifically, in particular embodiments, each web page that implements a screen or display of the user interface may be implemented using a suitable programming language. In particular embodiments, when a web view 460 is constructed to display a web page (e.g., by application user interfaces 430 in response to an output event), the code implementing the web page is loaded into web view 460.

In particular embodiments, a user of a system that contains or has access to contact information may wish to access the contact information of other users of the system. As used herein, a "user" may include an individual, a group of individuals, or an entity. Moreover, this disclosure contemplates any suitable system that contains or has access to contact information. For example and not by way of limitation, a system may be a network or a device that contains or has access to contact information. Contact information includes any suitable information identifying an individual, entity, or device, such as a physical location, a telephone number or other identifying number, a username or other identifying string of characters, etc. Contact information may be stored on or accessed on any suitable device, such as a mobile phone, a personal computer, a kiosk, a personal digital assistant (PDA), a tablet, or any other suitable device. In particular embodiments, contact information may be stored on a server or memory element remotely located from the user that the contact information relates to or the user/device accessing the contact information.

Contact information may be organized in a variety of ways. In particular embodiments, contact information may be dynamically sorted before being displayed to a user. The sorting process may occur automatically, upon request, or at pre-determined times. For example, contact information may be sorted when a user activates an application or device, and then may be sorted at pre-determined times or intervals as the user uses the application or device. As another example, sorting may occur when a user requests a sort to occur, for example by providing any suitable input to a device or application. As another example, sorting may occur when there is a change or pre-set amount of change in a variable or condition that the sorting is based on. While this disclosure provides specific examples illustrating when contact information may be dynamically sorted, this disclosure contemplates any suitable event or timing that initiates a dynamic sort of contact information.

In particular embodiments, contact information may be dynamically sorted based on any suitable variable or metric. In particular embodiments, contact information may be sorted based on one or more contemporaneous attributes of the user accessing contact information (the "first user") and one or more contemporaneous attributes of one or more other users whose contact information is being accessed (the "second users"). As used herein, a "contemporaneous attribute" is an attribute describing or based on present information about a user, including his or her likes, dislikes, preferences, plans, environment, or any other suitable information describing or based on present information about a user. For example and not by way of limitation, a contemporaneous attribute may be a location of a user or an intended location (such as a sporting venue, bar, restaurant, private/public structure, etc) of a user. As another example, a contemporaneous attribute may be one or more places where a user has previously been located. In particular embodiments, a contemporaneous attribute may be any suitable preferences of the user, for example music, food, restaurants, businesses, websites, entertainment, or individuals or groups a user likes or dislikes. In particular embodiments, a contemporaneous attribute may be individuals or groups a user is or has plans to be in proximity of. In particular embodiments, a contemporaneous attribute may be an emotional state articulated by or inferred from content created by a user. For example, content such as a post or series of posts on a message board, instant messaging application, or social networking website may contain explicit statements of a user's emotional state (e.g. "I'm happy!") or implicit statements from which a user's emotional state may be inferred (e.g. "Still can't believe we lost the football game"). In particular embodiments, a contemporaneous attribute may be current or future plans articulated by or inferred from content created by a user. In particular embodiments, a contemporaneous attribute may be specific applications a user opens or is running, the device the user is using, or interactions between a user and the device. While this disclosure provides specific examples of contemporaneous attributes, this disclosure contemplates any suitable contemporaneous attributes used for sorting contact information. Moreover, this disclosure contemplates any suitable method or way of storing or accessing the information included in a contemporaneous attribute. For example, such information may be stored in any suitable data structure (such as a database) on a device or network, such as the example device and network described herein. In particular embodiments, the information may be part of a social networking system. For example, the social networking system may have access to information that makes up a contemporaneous attribute for a user through nodes or edges relating to the user, as described more fully above. Furthermore, while this disclosure provides specific examples of the devices or networks from which information relating to a contemporaneous attribute may be accessed, this disclosure contemplates any suitable device, network, or storage media storing or accessing information making up a contemporaneous attribute.

This disclosure contemplates any suitable method or way of sorting contact information based on contemporaneous attributes. In particular embodiments, contact information may be sorted based on how well one or more contemporaneous attributes of the second users match one or more contemporaneous attributes of the first user. For example, contact information may be sorted based on a degree of match between the contemporaneous attribute of a first user and the corresponding contemporaneous attributes of the second users. For example, if a contemporaneous attribute used for sorting includes information about location of a user, the contact information may be sorted by proximity of the second users to the first user, In other words, contacts whose contemporaneous attributes corresponding to location indicates the contact is nearer to the first user will appear before contacts whose contemporaneous attributes corresponding to location indicates the contact is farther from the first user. As another example, a contemporaneous attribute may be a user's plan to go to a social gathering or to a restaurant for dinner. The contact information of those users who have plans to go to the same social gathering or restaurant may appear before the contact information of those users who have plans to go to any social gathering or restaurant, which may appear before the contact information of those users who have no plans to go to any social gathering or restaurant. In another embodiment, the contact information of the users who have no plans could appear before the contact information of the users who have plans to go to a different social gathering. As another example, a contemporaneous attribute may be interactions a user is currently having with a device or application, such as a game the user is playing. Contact information of those users who are playing the same game or have logged more time playing the game may appear before contact information of users not currently playing the game or who have logged less time playing the game. Likewise, sorting may be based on any application open or initiated by a user. As another example, a contemporaneous attribute may be a user's emotional state. The user's contacts may be sorted by user's having the same emotional state, or by user's having the opposite emotional states (e.g. if the user is sad, contacts who are happy may appear before contacts who are sad.) In particular embodiments, more than one contemporaneous attribute may be used to sort contacts. For example, contacts may be sorted by both proximity and using a specific application. For example, if two user meet at a location, want to exchange contact information, and open their contacts list or application, then each user may appear at the top of the other's contact list. In addition, this example illustrates that contact information included for sorting may be contact information available to a system accessing the contact information, not just contact information that a user has already identified or added to their personal list of contacts. In other words, in particular embodiments, a user may not need to previously have had access to another user's contact information for that contact information to be included in a sorting routine and displayed to the user.

While this disclosure provides specific examples of ways of dynamically sorting contact information based on contemporaneous attributes of users, this disclosure contemplates any suitable way or method of dynamically sorting contact information based on contemporaneous attributes of the users. Moreover, this disclosure contemplates any suitable method or way of performing the sorting of the contact information once the contemporaneous attributes determining the sort order are specified. For example and not by way of limitation, Comb Sort, Merge Sort, Heapsort, or Bubble sort are specific sorting algorithms that may be used in particular embodiments to perform sorting of contact information. These methods may be implemented by any suitable computing system, for example by a device or network component.

Once contact information is sorted, contact information may be displayed to the user accessing the contact information. This disclosure contemplates any suitable display of and format for displaying contact information. For example, sorted contact information may be displayed in a list that is navigable by the user accessing the information. As another example, contact information may be displayed in predetermined sets or groups, e.g. in groups of 5 or 10 users the contact information relates to. As another example, sorted contact information may be automatically displayed to a user, such as by a pop-up window or application on a device. As another example, an interactive element such as a dialog box may automatically be displayed that allows a user to accept or decline display of the contact information. In particular embodiments, the format and process of displaying sorted contact information may be alterable and set by the user accessing the contact information or by a user of the specific device the contact information is displayed on. While this disclosure described specific examples of formats and ways of displaying sorted contact information, this disclosures contemplates any suitable format or way of displaying sorted contact information.

Figure 5:
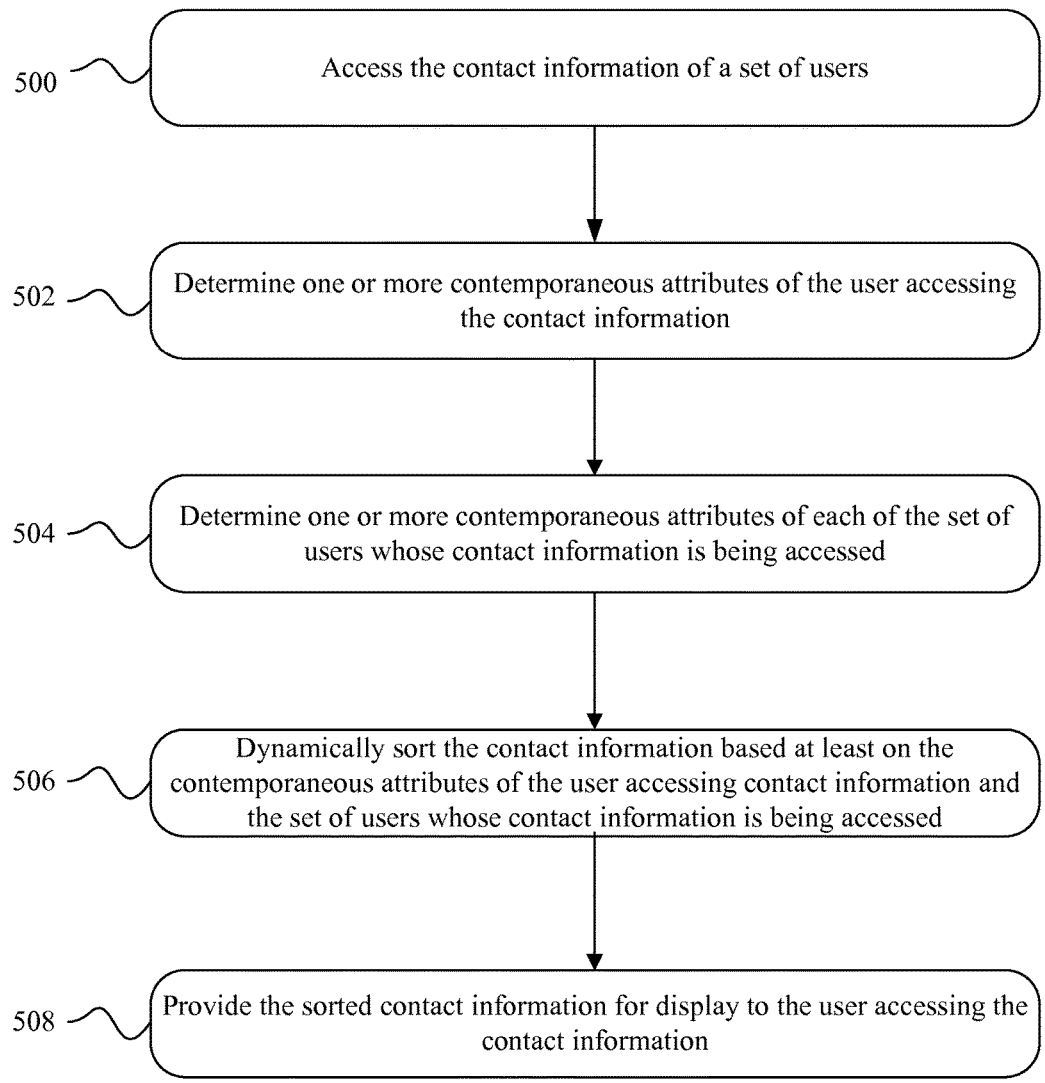
FIG. 5 illustrates an example method of dynamically sorting contact information.

FIG. 5 illustrates an example method for dynamically sorting contact information. The steps of FIG. 5 may be performed by any suitable device, component, software, network component, or any suitable combination thereof. For example, in particular embodiments one or more steps of FIG. 5 may be performed by example server 120 illustrated in FIG. 1 or example processor 310 or memory 320 illustrated in FIG. 3A. The method of FIG. 5 may start at step 500, where contact information of a set of users is accessed. At step 502, one or more contemporaneous attributes of the user accessing the contact information is determined. At step 504, one or more contemporaneous attributes is determined for each of the set of users whose contact information is being accessed. At step 506, the contact information is sorted based at least on the contemporaneous attributes of the user accessing the contact information and the set of users whose contact information is being accessed. At step 508, the sorted contact information is provided for display to the user, at which point the method may end. Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, software or systems carrying out any suitable steps of the method of FIG. 5.

Figure 6:
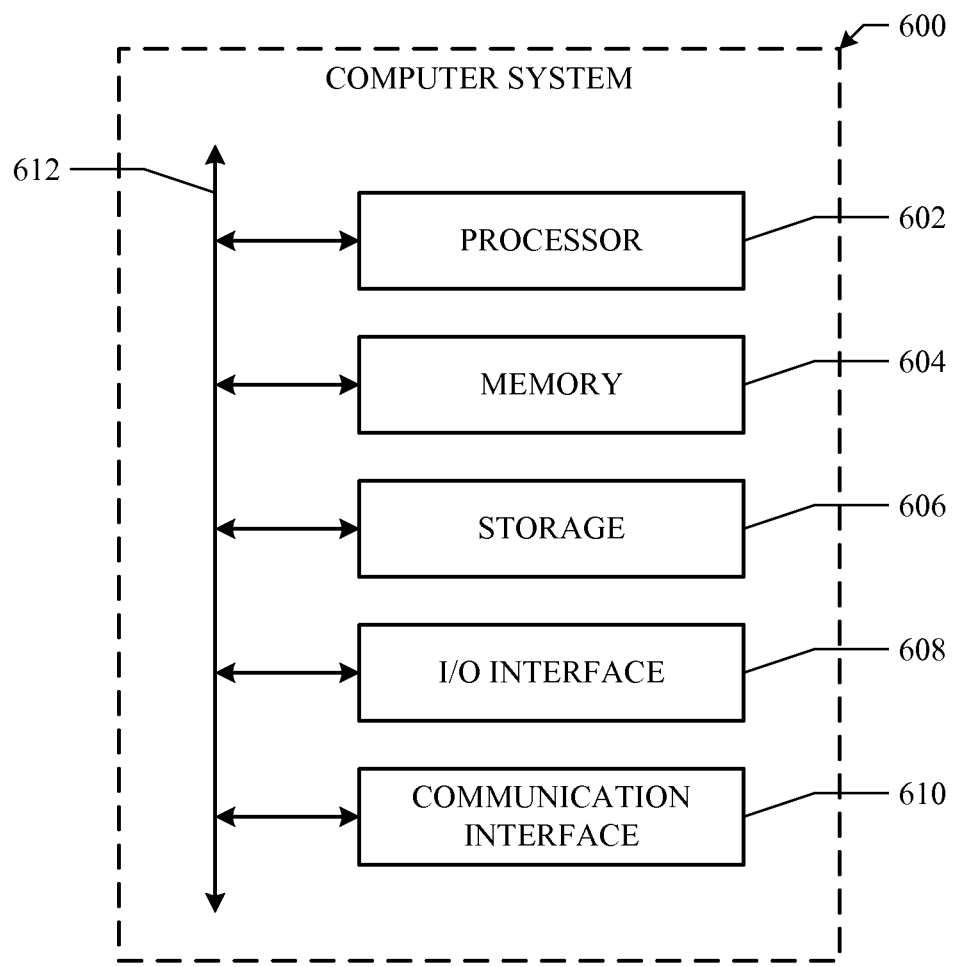
FIG. 6 illustrates an example computer system for performing particular embodiments.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 02 to memory 604. Bus 612 may include one or more memory buses, as described below. In particular embodiments, one or more memory management units (MMUs) reside between processor 602 and memory 604 and facilitate accesses to memory 604 requested by processor 602. Although this disclosure describes and illustrates particular memory, this disclosure contemplates any suitable memory.

In particular embodiments, storage 606 includes mass storage for data or instructions. Storage 606 may include removable or non-removable (i.e., fixed) media, where appropriate. Storage 606 may be internal or external to computer system 600, where appropriate. In particular embodiments, storage 606 is non-volatile, solid-state memory. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it. Although this disclosure describes and illustrates a particular communication interface, this disclosure contemplates any suitable communication interface.

In particular embodiments, bus 612 includes hardware, software, or both coupling components of computer system 600 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by one or more computing devices, accessing for a first user contact information of a plurality of second users, wherein the first and second users are users of a social-networking system comprising a graph comprising a plurality of nodes and edges connecting the nodes, the nodes comprising user nodes that each correspond to a user of the social-networking system, there being a node in the graph corresponding to the first user, there being a node in the graph corresponding to each of the second users;

by at least one of the one or more computing devices, determining a current use by the first user of an application for accessing contact information;

by at least one of the one or more computing devices, determining, for at least one of the second users, a current use by the second user of the application;

by at least one of the one or more computing devices, determining a current location of the first user and a current location of the second user;

by at least one of the one or more computing devices, determining that at least one of the second users is not a contact of the first user;

by at least one of the one or more computing devices, dynamically sorting the contact information of the second users by giving preference to contact information of:

at least one second user for whom a current use of the application occurs during a time that the second user is determined to be at the same location as the first user, and the at least one second users determined not to be a contact of the first user;

by at least one of the one or more computing devices, re-sorting the contact information of the second users in response to a determination that at least one of:

at least one second user's current use of the application;
at least one second user's location;
the first user's current use of the application; or
the first user's location changed by a predetermined amount; and by at least one of the one or more computing devices, providing the contact information of the second users as sorted for display to the first user.

2. The method of claim 1, wherein dynamically sorting the contact information of the second users is further based on one or more contemporaneous attributes of the first user, the one or more contemporaneous attributes of the first user comprising information describing one or more of the first user's:

preferences;
plans;
emotional state;
interactions with a network; or
individuals or entity in the proximity of the first user's location.

3. The method of claim 1, wherein dynamically sorting the contact information of the second users is further based on one or more contemporaneous attributes of one or more of the second users the one or more contemporaneous attributes of each of the second users comprising information describing one or more of the second user's:

preferences;

plans;
emotional state;
interactions with a network; or
individuals or entity in the proximity of the second user's location.

4. The method of claim 2, wherein one or more of the contemporaneous attributes of the first user are determined from express information associated with:
nodes in the graph corresponding to the first user; or
edges connected to nodes corresponding to the first user.

5. The method of claim 2, wherein one or more of the contemporaneous attributes of the first user are determined from implicit information inferred from express information associated with:
nodes in the graph corresponding to the first user; or
edges connected to nodes corresponding to the first user.

6. The method of claim 1, wherein dynamically sorting the contact information of the second users comprises sorting based on a degree of similarity between the use of the application by the first user and the use of the application by the second user.

7. The method of claim 1, wherein the current use of the application by the first user and the current use of the application by the second user comprises opening the application.

8. One or more computer-readable non-transitory storage media embodying software that is operable when executed to:
access for a first user contact information of a plurality of second users, wherein the first and second users are users of a social-networking system comprising a graph comprising a plurality of nodes and edges connecting the nodes, the nodes comprising user nodes that each correspond to a user of the social-networking system, there being a node in the graph corresponding to the first user, there being a node in the graph corresponding to each of the second users;
determine a current use by the first user of an application for accessing contact information;
determine, for at least one of the second users, a current use by the second user of the application;
determine a current location of the first user and a current location of the second user;
determine that one of the second users is not a contact of the first user;
dynamically sort the contact information of the second users by giving preference to contact information of:
at least one second user for whom a current use of the application occurs during a time that the second user is determined to be at the same location as the first user,
and
the at least one second users determined not to be a contact of the first user;
re-sort the contact information of the second users in response to a determination that at least one of:
at least one second user's current use of the application;
at least one second user's location;
the first user's current use of the application; or
the first user's location
changed by a predetermined amount; and
provide the contact information of the second users as sorted for display to the first user.

9. The media of claim 8, wherein the software is further operable when executed to dynamically sort the contact information of the second users based on one or more contemporaneous attributes of the first user, the one or more contemporaneous attributes of the first user comprising information describing one or more of the first user's:
preferences;
plans;
emotional state;
interactions with a network; or
individuals or entity in the proximity of the first user's location.

10. The media of claim 8, wherein the software is further operable when executed to dynamically sort the contact information of the second users based on one or more contemporaneous attributes of one or more of the second users, the one or more contemporaneous attributes of each of the second users comprising information describing one or more of the second user's:
preferences;
plans;
emotional state;
interactions with a network; or
individuals or entity in the proximity of the second user's location.

11. The media of claim 9, wherein one or more of the contemporaneous attributes of the first user are determined from express information associated with:
nodes in the graph corresponding to the first user; or
edges connected to nodes corresponding to the first user.

12. The media of claim 9, wherein one or more of the contemporaneous attributes of the first user are determined from implicit information inferred from express information associated with:
nodes in the graph corresponding to the first user; or
edges connected to nodes corresponding to the first user.

13. The media of claim 8, wherein the software is further operable when executed to dynamically sort the contact information of the second users based at least on a degree of similarity between the use of the application by the first user and the use of the application by the second user.

14. A system comprising:
one or more processors; and
a memory coupled to the processors comprising instructions executable by the processors, the processors operable when executing the instructions to:
access for a first user contact information of a plurality of second users, wherein the first and second users are users of a social-networking system comprising a graph comprising a plurality of nodes and edges connecting the nodes, the nodes comprising user nodes that each correspond to a user of the social-networking system, there being a node in the graph corresponding to the first user, there being a node in the graph corresponding to each of the second users;
determine a current use by the first user of an application for accessing contact information;
determine, for at least one of the second users, a current use by the second user of the application;
determine a current location of the first user and a current location of the second user;
determine that one of the second users is not a contact of the first user;
dynamically sort the contact information of the second users by giving preference to contact information of:
at least one second user for whom a current use of the application occurs during a time that the second user is determined to be at the same location as the first user,
and the at least one second users determined not to be a contact of the first user;
re-sort the contact information of the second users in response to a determination that at least one of:
at least one second user's current use of the application;
at least one second user's location;
the first user's current use of the application; or
the first user's location
changed by a predetermined amount; and
provide the contact information of the second users as sorted for display to the first user.

15. The system of claim 14, wherein the processors are further operable when executing the instructions to dynamically sort the contact information of the second users based on one or more contemporaneous attributes of the first user, the one or more contemporaneous attributes of the first user comprising information describing one or more of the first user's:
preferences;
plans;
emotional state;
interactions with a network; or
individuals or entity in the proximity of the first user's location.

16. The system of claim 14, wherein the processors are further operable when executing the instructions to dynamically sort the contact information of the second users based on one or more contemporaneous attributes of one or more of the second users, the one or more contemporaneous attributes of each of the second users comprising information describing one or more of the second user's:
preferences;
plans;
emotional state;
interactions with a network; or
individuals or entity in the proximity of the second user's location.

17. The system of claim 15, wherein one or more of the contemporaneous attributes of the first user are determined from express information associated with:
nodes in the graph corresponding to the first user; or
edges connected to nodes corresponding to the first user.

18. The system of claim 15, wherein one or more of the contemporaneous attributes of the first user are determined from implicit information inferred from express information associated with:
nodes in the graph corresponding to the first user; or
edges connected to nodes corresponding to the first user.

19. The system of claim 14, wherein the processors are further operable when executing the instructions to dynamically sort the contact information of the second users based at least on a degree of similarity between the use of the application by the first user and the use of the application by the second user.

* * * * *